Figure 1:
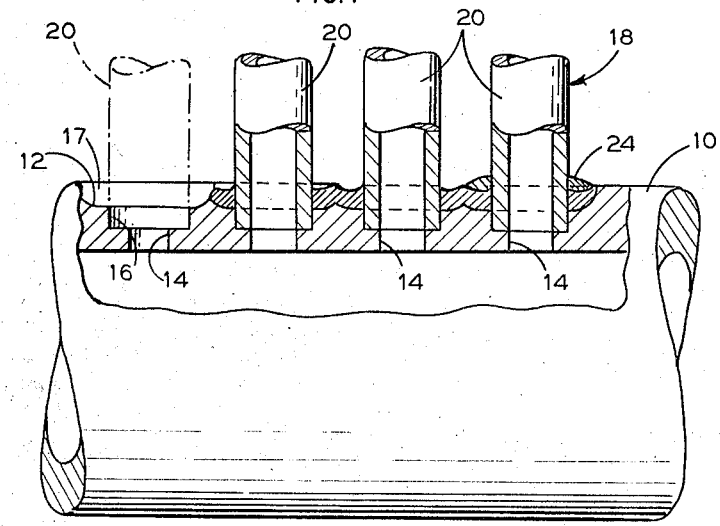

Dec. 13, 1966     R. WALKER     3,291,962

WELDMENT AND METHOD OF MAKING SAME

Filed March 31, 1966

INVENTOR.
Robert Walker

BY

*J. P. Moran*

ATTORNEY

United States Patent Office 3,291,962
Patented Dec. 13, 1966

3,291,962
WELDMENT AND METHOD OF MAKING SAME
Robert Walker, Wadsworth, Ohio, assignor to The Babcock & Wilcox Company, New York, N.Y., a corporation of New Jersey
Filed Mar. 31, 1966, Ser. No. 539,105
8 Claims. (Cl. 219—137)

This invention relates to an improved weldment and method of making it, especially as applied to the junctions between a header and the aligned tube ends of once-through vapor generating apparatus.

The present invention is an improvement over conventional practice wherein two welders positioned on opposite sides of the header, cooperate to produce an encircling weldment at the junction of a header and each associated tube end.

With the present invention, the ends of tubes arranged in a row are received in aligned counterbores in the header, and the weld metal is continuously deposited in a sinuous or scalloped path first along one side of the tube row and then along the other side to the point of beginning. The resultant weldment thus includes substantially semi-circular deposits of weld metal at each such tube junction with the header, on opposite sides of the centerline of the counterbores, but with the ends of the semi-circular weld deposits overlapping between adjacent tubes and along that centerline. This complete weldment can be accomplished in much less time and by a single welder resulting in greater manufacturing efficiency and economy since it is in effect a continuous welding process.

Figure 2:
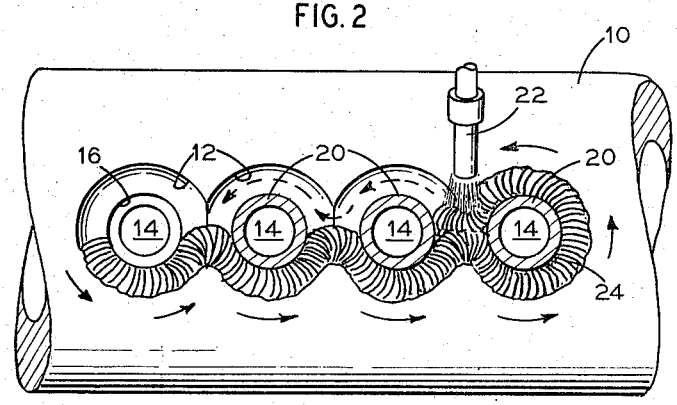

In the drawing:

FIG. 1 is a partially sectional elevational view of an assembly partly welded according to the invention; and FIG. 2 is a plan view of the same.

As shown in the drawing, the assembly to be welded comprises a horizontally elongated tubular header 10 of circular cross section provided with a longitudinal series of sockets or exterior surface depressions 12, each having at the bottom or inner end thereof a concentrically positioned bore 14 and a counterbore 16, extending radially and perpendicularly with respect to the header axis. A tube row, generally designated by the numeral 18, comprises a row or series of aligned tubes 20 of circular cross section disposed vertically and in spaced parallel relationship.

The lower ends of the tubes 20 are received in the respective counterbores 16 so as to be below the exterior surface of the header 10, with the lower end portion of each tube defining with its depression 12 an annular groove 17 in which weld metal is to be deposited. The size of each groove 17, in terms of its width and depth, is such as to provide a repository for deposited weld metal and to ensure the formation of a strong, fluid-tight joint.

Depending on the tube spacing, the depressions 12 and the resultant weld grooves 17 may be in overlapping relationship, as shown, to the end of facilitating the continuous depositing of weld metal, as will be described hereinafter.

The tube 20 at the left hand end of the row is shown in phantom by broken lines in FIG. 1 in order to show the depression 12, the bore 14 and counterbore 16 with greater clarity. It will be appreciated, however, that all tubes 20 should be in place in the counterbores 16 when practicing the welding method of the present invention.

Preferably, the diameter of the bore 14 is substantially the same as the inside diameter of the tube 20, and the diameter of the counterbore 16 is the same as the outside diameter of the tube 20 to provide a snug fit. Furthermore, the ends of the tubes are of cylindrical shape and cut to length at right angles to the tube axis so that the annular edge of each tube end seats snugly against the mutually facing surface of the counterbore 16. Thus snugly fitted and secured, there will be a smooth, uninterrupted fluid flow path between the tubes 20 and the header 10, with little chance of deposited weld metal entering the bore 14.

The header 10, the tubes 20, and the weld metal are preferably of steel, the composition of which is suited in terms of strength and temperature capabilities to the use requirements proposed for the assembly.

Conventionally, the tube ends are individually welded to the header by two welders working with consumable stick electrode on opposite sides of the header, because the spacing of the tubes is such that it is not possible for one welder to perform a continuous circumferential weld at the junction of each tube and the header from a position on one side of the header. Therefore, the usual practice is for a welder positioned on one side of the header to perform the first half of each such weld along a semicircular line, and for another welder stationed on the other side of the header to continue the weld to the point of beginning, thereby completing a circular weldment around the joint between the tube and the header. The main disadvantage of this conventional method, however, is that it can require up to 5 times the number of man hours to accomplish the same result achieved by the method of the present invention, now to be described.

According to the present invention, the headers are prepared as aforesaid by providing them with longitudinally aligned depressions 12, bores 14 and counterbores 16, after which the tube ends are seated in the counterbores 16 below the surface of the header 10. Next, it is preferred that semi-automatic welding apparatus having a constant potential power source and a continuous source of flux-core type welding wire be utilized to join the tubes 20 to the header 10 by applying localized heat and continuously depositing weld metal, first along one side of the tube row 18 from one end of the header to the other and then without interruption to and along the other side of the tube row. Each weld pass may start at an end tube and proceed to the other end tube along a side of the tube row 18 in a sinuous path which does not weave in and out of the tubes 20. Rather, the weld pass is continuous on one side of the line of centers of the counterbores 14 and along a substantial portion of the annular junction between each tube 20 and the header 10, and also along portions of the longitudinal line of counterbores 14 between the tubes 20.

The invention will also be practiced by welding a circumferential array of radial tubes to a header of circular cross section.

The semi-automatic welding apparatus may be of the type which uses a constant potential power source with a magnetically controlled welding wire feeder. The welding wire or electrode is a flux core type usually supplied in 25 or 50 pound coils, and it is thus possible to deposit weld metal continuously in the weld groove while the electrode makes a deep penetrating arc shielded by an oxygen-free gas. Several passes, usually three, on both sides of the tube row 18 are made until the weldment completely fills the weld groove 17 and the tube ends are securely joined to the header in fluid-tight relationship. Between each pass, slag is removed from the surface of the deposited weld metal, preferably using a pneumatic vibrator tool. Only the hand-held head of the welding apparatus is shown in FIG. 2, being designated by the numeral 22. The weldment is designated by the numeral 24.

The weldment 24 joining the tubes 20 to the header 10 extends continuously and sinuously all along one side of the tube row 18 and then down the other side of the tube row. The semi-circular weld deposits at the tube-header junctions lie on opposite sides of the longitudinal line extending through the centers of the counterbores 16, with the ends of the semi-circular deposits at each tube overlapping, e.g. at locations between the tubes 20 and along the longitudinal line.

The completed weldment 24 extends continuously and sinuously first along one side of the tube row 18, around the last tube in the row, and then along the other side of the tube row to the point of beginning. The weldment follows the weld groove 17, and therefore includes substantially semi-circular deposits of weld metal at the junctions of the header 10 and the tubes 20 on opposite sides of the line of counterbores 16, the ends of the semi-circular deposits overlapping from opposite sides of the line at locations between the tubes 10.

From the foregoing it can be seen that tubes in a row can be joined to a header by a continuous welding process and in a manner which not only ensures proper positioning and welding at the tube-header junctions, but which also accomplishes the same with greater efficiency and economy.

What is claimed is:

1. A fluid-conducting assembly comprising:
   (a) an elongated header;
   (b) said header being provided with a series of counterbores along a line extending longitudinally of said header;
   (c) a row of tubes with the respective ends thereof received in said counterbores;
   (d) and a weldment joining said tubes to said header extending continuously and sinuously, first along one side of the tube row, around the last tube in said row, and then back along the other side of the tube row to the point of beginning, said weldment including substantially semi-circular deposits of weld metal at the junctions of the header and the tubes on opposite sides of said longitudinal line, the ends of which semi-circular deposits overlap from opposite sides of said line at locations between said tubes and along said line.

2. The assembly of claim 1 wherein said header and said tubes are of circular cross section, said header having a cross section larger than the cross section of said tubes, and the ends of said tubes in said counterbores are below the surface of said header.

3. The assembly of claim 1 wherein the tubes are in generally parallel relationship and arranged perpendicular to the longitudinal line.

4. The method of weld uniting a plurality of tubes of circular cross section to an elongated header comprising the steps of:
   (a) providing said header with a plurality of counterbores along a line which extends longitudinally of said header,
   (b) arranging the tubes in a row with an end of each of them received in a counterbore,
   (c) joining said tubes to said header at the junctures formed by the header and the tubes by applying localized welding heat continuously and sinuously first along one side of the tube row, around the last tube in said row, and then back along the other side of the tube row to the point of beginning while simultaneously depositing weld metal on said header between said tubes and at said junctures with semi-circular deposits of weld metal on opposite sides of the line extending longitudinally of said header so that the ends of the semi-circular deposits overlap at each juncture along said longitudinal line.

5. The method according to claim 4 wherein the localized heat is applied and the weld metal is deposited by electric welding apparatus in which a consumable electrode having a flux core is supplied from a reel to ensure continuity of heat application and weld metal deposition, and including the further step of shielding the welding point with an oxygen-free gas.

6. The method according to claim 4 including the step, performed prior to welding, of arranging the tubes in generally parallel relationship and perpendicular to the longitudinal line, with the ends of the tubes being below the outer surface of said header.

7. The method according to claim 4 including the steps of:
   making several passes as in (c) to join said tubes to said header,
   and removing slag from the surface of the deposited weld metal after each pass.

8. The method according to claim 4 wherein the weld metal is deposited by electric welding apparatus in which a consumable electrode having a flux core is supplied from a reel to ensure continuity in making each weld pass and including the further steps of:
   shielding the weld at the point of deposition with an oxygen-free gas,
   arranging the tubes prior to welding in generally parallel relationship perpendicular to the longitudinal line, with the cylindrical ends thereof below the outer surface of said header,
   making several passes as in (c) to join said tubes to said header,
   and removing slag from the surface of the deposited weld metal after each pass.

References Cited by the Examiner

UNITED STATES PATENTS

| | | | |
|---|---|---|---|
| 1,949,251 | 2/1934 | Gilbert | 219—125 |
| 2,441,748 | 5/1948 | Black | 219—124 |
| 2,827,551 | 3/1958 | Orr et al. | 219—137 |
| 3,154,666 | 10/1964 | Lorentz | 219—137 |

RICHARD M. WOOD, *Primary Examiner.*